United States Patent [19]

Miller

[11] Patent Number: 5,974,496
[45] Date of Patent: Oct. 26, 1999

[54] SYSTEM FOR TRANSFERRING DIVERSE DATA OBJECTS BETWEEN A MASS STORAGE DEVICE AND A NETWORK VIA AN INTERNAL BUS ON A NETWORK CARD

[75] Inventor: Steven M. Miller, Batavia, Ill.

[73] Assignee: NCR Corporation, Dayton, Ohio

[21] Appl. No.: 08/778,339

[22] Filed: Jan. 2, 1997

[51] Int. Cl.[6] .................................................. G06F 13/00
[52] U.S. Cl. ............................... 710/128; 710/36; 710/38
[58] Field of Search ........................... 370/257; 345/435; 710/128, 36, 38

[56] References Cited

U.S. PATENT DOCUMENTS

| 5,230,041 | 7/1993 | Dinwiddie, Jr. et al. | 395/162 |
|---|---|---|---|
| 5,245,322 | 9/1993 | Dinwiddie, Jr. et al. | 345/115 |
| 5,247,671 | 9/1993 | Adkins et al. | 395/673 |
| 5,283,638 | 2/1994 | Engberg et al. | 348/14 |
| 5,305,317 | 4/1994 | Szczepanek | 370/257 |
| 5,309,564 | 5/1994 | Bradley et al. | 395/200 |
| 5,335,321 | 8/1994 | Harney et al. | 395/162 |
| 5,394,526 | 2/1995 | Crouse et al. | 395/200.49 |
| 5,408,465 | 4/1995 | Gusella et al. | 370/17 |
| 5,428,732 | 6/1995 | Hancock et al. | 395/154 |
| 5,434,590 | 7/1995 | Dinwiddie, Jr. et al. | 345/115 |
| 5,434,592 | 7/1995 | Dinwiddie, Jr. et al. | 345/133 |
| 5,450,551 | 9/1995 | Amini et al. | 395/299 |
| 5,455,950 | 10/1995 | Vasseur et al. | 395/700 |
| 5,461,611 | 10/1995 | Drake, Jr. et al. | 370/54 |
| 5,499,341 | 3/1996 | Wilson et al. | 395/200.03 |
| 5,634,040 | 5/1997 | Her et al. | 345/435 |

Primary Examiner—Le Hien Luu
Attorney, Agent, or Firm—Maginot, Additon & Moore

[57] ABSTRACT

An I/O card for a computer system having a system bus and a first processor, includes a first connector, a second connector, a third connector, a second processor, each operatively coupled to an internal bus. The first connector is configured to detachably couple to the system bus. The second connector is configured to detachably couple to a storage device. The third connector is configured to detachably couple to a network. The second processor is configured to control at least a portion of a transfer of a diverse data object between said storage device and said network via said internal bus. A method of transferring a diverse data object between a storage device and a network is also disclosed.

19 Claims, 2 Drawing Sheets

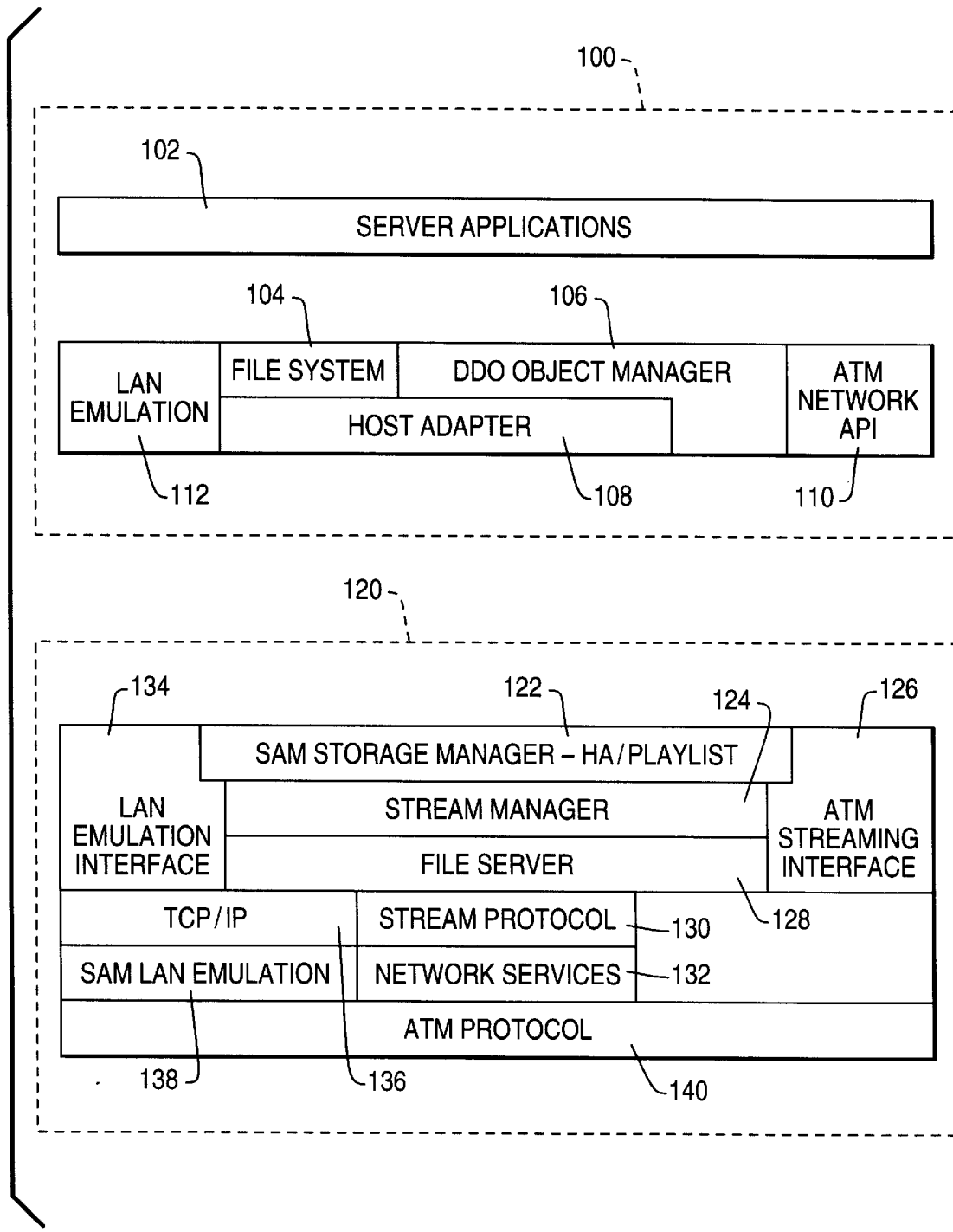

SYSTEM FOR TRANSFERRING DIVERSE DATA OBJECTS BETWEEN A MASS STORAGE DEVICE AND A NETWORK VIA AN INTERNAL BUS ON A NETWORK CARD

BACKGROUND OF THE INVENTION

The present invention relates generally to the storage and retrieval of multimedia information in a high speed ATM networking environment and more particularly to an input-output device that can be used as a multimedia server add-on to an existing personal computer or workstation.

One trend in personal and business computer systems is to provide the capability to send and receive multimedia data. Multimedia data includes audio, video, graphics, and facsimile as well as data files. These different types of multimedia are also referred to as diverse data objects, DDO. If these diverse data objects must be transmitted or received without perceptible delay to the user, the application requires real time data transmission, referred to as real time DDO. Traditional data services such as file transfer or electronic mail generally do not require real time data transmission. However, multimedia applications that integrate digital audio and video require certain minimum transmission times in order to provide the user the type of response (real time) that the user is accustomed to receiving. Users of multimedia services will not tolerate delays or interruptions in voice or video due to throughput delays on a communications network.

One critical element that comprises a typical communications service interface is the Quality of Service (QoS). A given communications system has defined QoS parameters that may include communications link setup time, end-to-end delay, data loss probability, and synchronization. From a user perspective, a guaranteed QoS means the reception of multimedia without perceptible delay or interruptions. Thus full motion video requires a higher QoS than electronic mail since electronic mail is a non-real time DDO and full motion video is a real time DDO. In essence, QoS is another name for network bandwidth management. Certain applications that are multimedia intensive require larger amounts of dedicated bandwidth in order to provide a guaranteed Quality of Service to the network user.

Multimedia data is often transmitted over some type of communications network. Typical networks include local area networks (LANs) such as Ethernet or FDDI, or wide area networks (WANs) such as the Internet or Integrated Services Digital Network (ISDN). Personal computers and workstations with multimedia capability can connect to a communications network to transmit and receive diverse data objects.

The trend in networking technology is toward broadband integrated communications networks designed for bit transmission rates ranging from megabits to gigabits per second. A predominant driving force behind this trend is the large amount of digital data bandwidth needed to represent and transmit video and graphics data objects.

The broadband integrated services digital network (B-ISDN) is designed to support the high data rates necessary to transmit real time DDO. B-ISDN uses a type of data transfer known as asynchronous transfer mode (ATM) to transport data in blocks of data referred to as cells. ATM data transmission will likely take place over fiber optic networks due to the high data speeds and favorable wide transmission bandwidths of fiber optics. International standards are in place for high speed data transmission over fiber optics using a synchronous optical network referred to as SONET.

SONET is a network service capable of delivering multiple channels of data from various sources in transmission rates that start at an optical carrier (OC) rate of 51.84 Mbps. Thus OC-1 is 51.84 Mbps. Two standard high speed SONET networks proposed are OC-3 at 155.52 Mbps and OC-12 at 622.08 Mbps. Since SONET networks will carry multimedia voice, video, and image as well as traditional data, the basic unit of 8-bit measure is referred to as an octet rather than a byte. In summary, SONET and ATM architectures are used in combination as part of the overall broadband ISDN network.

Workstations and personal computers have evolved with faster and larger semiconductor microprocessors and memories to be able to process the large amounts of digital data. The use of improved bus architectures including MCA, PCI, and ISA has also improved the data handling capabilities of personal computers and workstations. But even with the improvements in microprocessor, memory, and bus technology, it places a high demand on computer resources each time a multimedia application or stream of diverse data objects is transmitted or received by a computer system. The demands on a personal computer or workstation to process information increase once a connection is made to a high speed network such as broadband ISDN. This is particularly true if the primary data bus is used both for microprocessor communications to memory and I/O and external multimedia communications.

A direct connection to a high speed communications network is common for low speed applications using traditional analog modems and predominately non-real time applications. Traditionally, an optional communications card can be purchased for a PC or workstation to allow single user point-to-point communications. A major drawback of this approach, however, is that the add-on card uses the computer system bus for communications. Although acceptable at kilobit data transmission rates, true high speed transmission is extremely difficult using this approach.

In addition, it is useful in high speed networks to be able to manage Quality of Service requirements and multimedia transmission or reception requests with some type of communications server. Communications servers are devices connected to a given LAN or WAN network in order to manage communications. Traditional communications server functions include connection of one or more personal computers or workstations to a network, allocation of a channel or bandwidth for communications, and the ability to temporarily store data until it can be processed by the personal computer or workstation. A communication server can also be used to store multimedia for broadcasts retransmission to multiple users.

Heretofore, a dedicated server using dual state of the art Intel Pentium processors configured using NT server architecture is unable to support full speed ATM OC-3 data transmission speeds. It is therefore desirable to provide a method and architecture to relieve the host computer processor and memory of the responsibilities traditionally associated with network card interface support in order to construct a multimedia communications server capable of ATM speeds at OC-3 and higher data rates.

Most communication servers are dedicated servers, that is, they are dedicated to only the performance of communications management functions. A traditional multimedia server cannot be used as a personal computer or workstation, and in addition can be a costly component to add to a local area network.

The ability to match the amount of computing power, data bandwidth, or communication processing capacity to the amount needed for a given task is commonly referred to as scalability. When referring to the amount of data transmission bandwidth required for a given application, this scaleable concept is often referred to as bandwidth on demand. Thus when only a small amount of data must be transmitted over a computer network, only the amount of network bandwidth necessary to transmit the data is allocated to the application. Partitions of network capacity are called channels, and as an application's bandwidth requirements increase, the network can allocate more channels to that application.

Multimedia applications lend themselves well to scaleable network architectures. Scalability refers to the ability of distributed processing systems to add clients without degrading the overall performance of the system. For example, a host communications server can be used to provide for a scaleable number of simultaneous streams (playback) of a single copy of an object. One good example of this is video on demand. A multimedia server may have several hundred full length video movies stored in its memory. If a user were to demand from the network to view a given movie, a channel could be allocated to playback a single copy of the movie (object). As more users demanded to see the same movie, the communications server could then provide additional channels of video data as needed. In this manner, the multimedia server is scaleable.

Therefore, there is a need for a low cost solution for transforming a traditional personal computer or workstation into a high speed ATM multimedia server while preserving the personal computer or workstation functionality.

SUMMARY OF THE INVENTION

The present invention is directed to a method and an apparatus that satisfies this need for a low cost solution of transforming a traditional personal computer or workstation into a high speed ATM multimedia server while preserving the personal computer or workstation functionality.

In accordance with one embodiment of the present invention, there is provided a method of transferring a diverse data object between a storage device and a network. The method includes the steps of a first processor receiving a diverse data object request via a system bus; the first processor scheduling a second processor to control at least a portion of a transfer of the diverse data object between the storage device and the network; and the second processor causing the portion of the transfer of the diverse data object to be transferred between the storage device and the network via an internal bus.

Pursuant to another embodiment of the present invention, there is provided an I/O card for a computer system having a system bus and a first processor. The I/O card includes a first connector, a second connector, a third connector, a second processor, each operatively coupled to an internal bus. The first connector is configured to detachably couple to the system bus. The second connector is configured to detachably couple to a storage device. The third connector is configured to detachably couple to a network. The second processor is configured to control at least a portion of a transfer of a diverse data object between the storage device and the network via the internal bus.

Pursuant to yet another embodiment of the present invention, there is provided a communications server. The communications server includes a system bus for transmitting data, a first processor, and an I/O card. The first processor is coupled to the system bus and is configured to control a transfer of a diverse data object between a storage device and a network. The I/O card includes a first connector, a second connector, and a third connector, each operatively coupled to an internal bus. The first connector is configured to detachably couple to the system bus. The second connector is configured to detachably couple to the storage device, and the third connector is configured to detachably couple to the network. The I/O card decreases data traffic over the system bus by causing at least a portion of the diverse data object to be transferred between the storage device and the network via the internal bus.

It is therefore an object of the present invention to provide a new and useful communications server.

It is another object of the present invention to provide an improved communications server.

It is still another object of the present invention to provide a new and useful method of transferring a diverse data object between a storage device and a network.

It is another object of the present invention to provide an improved method of transferring a diverse data object between a storage device and a network.

It is moreover another object of the present invention to provide a cost effective multimedia server that is scaleable in the number of object streams it supports and allows for traditional computing all within one computer.

It is yet another object of the present invention to provide the ability to process multimedia communications tasks independent of the primary computer microprocessor and computer system bus.

It is also object of the present invention to provide a SONET/ATM network interface.

It is yet another object of the present invention to permit the host computer CPU to direct the SAM card CPU to interpret incoming network data cells or packets.

It is even yet another object of the present invention to be able to store real-time DDO and multicast (rebroadcast) the DDO as multiple data streams to clients over an ATM network.

The above and other objects, features, and advantages of the present invention will become apparent from the following description of the attached drawings.

BRIEF DESCRIPTION OF THE DRAWINGS

FIG. 2 is a protocol layered block diagram of the multimedia communications server using both the SAM hardware and software in accordance with the method of the present invention.

DETAILED DESCRIPTION OF THE DRAWINGS

Figure 1:
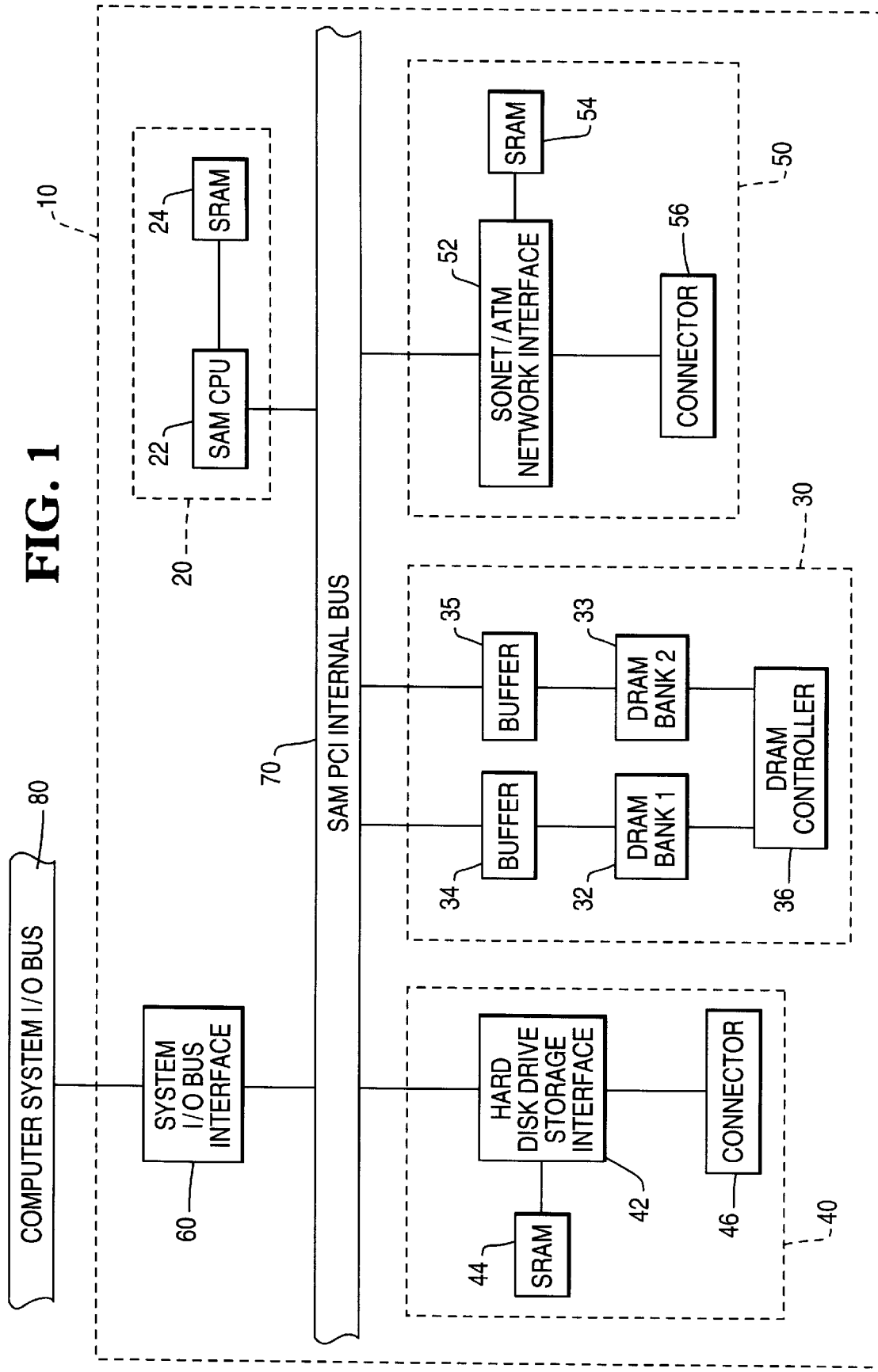
FIG. 1 is a block diagram of the Storage to ATM I/O (SAM) hardware with an internal PCI bus and an interconnection to a computer system I/O bus in accordance with the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the claims.

SAM System Hardware

Referring now to FIG. 1, there is shown a block diagram of the Storage to ATM I/O (SAM) card hardware 10 comprising a central processing unit (CPU) subsystem 20, local SAM dynamic RAM (DRAM) subsystem 30, hard disk drive storage subsystem 40, SONET/ATM network interface subsystem 50, system I/O bus interface 60, and SAM PCI internal bus 70. Also shown in FIG. 1 is the computer system I/O bus 80 for the computer or workstation utilizing the invention.

More particularly, the SAM CPU subsystem 20 includes a SAM CPU 22 and SAM CPU static RAM (SRAM) 24. An exemplary CPU for the SAM CPU 22 would be an Intel i960/ARM or similar microprocessor that contains timers, interrupts, and DMA channels necessary to control multimedia tasks performed by the invention on real-time diverse data objects.

It should be appreciated that the SAM CPU 22 should request block reads and writes up to the size of a DDO object buffer 34 or 35 from the hard disk drive storage subsystem 40. The SAM CPU should not expect an interrupt from the hard disk drive storage subsystem 40 until the data is transferred in or out of the SAM DRAM subsystem 30. This will minimize interrupts over the SAM PCI internal bus 70 and improve the overall performance of the invention.

All SAM card interrupts are consolidated at the SAM CPU 22. Depending on the choice of CPU, an external interrupt register may be required. The sources for the SAM interrupts are ATM Receive, ATM Transmit, SCSI, DMA, Host computer CPU, and the SAM software. The SAM CPU 22 will prioritize these interrupts and process them. When required, the SAM CPU 22 will issue interrupts to the host computer CPU.

This may be accomplished by utilizing a 16 bit interrupt I/O register. The SAM CPU sets a bit which forces a particular interrupt to the host computer CPU. The host computer CPU then reads the SAM interrupt register, which clears the interrupt bits, and then takes the required action. It is also possible for the host computer CPU to send the SAM card 10 messages by sending an interrupt to the SAM CPU 22 via the interrupt register.

An exemplary SAM CPU SRAM 24 for the SAM CPU subsystem 20 may have minimum of 8 MB of storage and a sufficiently fast access time to match the memory speed and real-time operating system requirements of the SAM hardware 10. It should be noted that the SAM DRAM subsystem 30, to be described later in detail, can be used by the SAM CPU subsystem for additional memory storage in excess of that provided by the SAM CPU SRAM 24.

The SAM DRAM subsystem 30 includes dynamic RAM (DRAM) storage banks 32 & 33, buffers 34 & 35 to interface DRAM memory storage banks 32 & 33 to the SAM PCI internal bus 70, and a DRAM controller 36. An exemplary DRAM storage bank 32 and DRAM storage bank 33 may be a SIMM module with a minimum of 8 MB of storage capacity expandable to 64 MB or more of storage capacity.

In the described embodiment, the SAM architecture calls for a large and fast local DRAM storage. The DRAM storage is divided into two separate memory banks to improve performance. Memory access for reading and writing four 32-bit words must be at a minimum a 4,1,1,1 (A,W,W,D,D, D,D) clock cycle from the internal SAM PCI bus perspective. This corresponds to a DRAM bandwidth of 72 MB. This is sufficient to support SONET OC-3 as shown in a calculation which follows.

In order to facilitate software control by the SAM operating system, the SAM DRAM should be capable of being mapped into Host kernel memory. This enables the host computer operating system to access the DRAM as if it was host kernel memory or host user memory. Thus the SAM card hardware 10 acts as a traditional high speed host adapter for the system with hooks to utilize the SAM DRAM as a kernel memory. This is particularly useful in large DDO applications including image processing, voice recognition, animation, and 3 dimensional images.

It should be noted that the invention provides for device drivers and applications running on the host computer system to take advantage of the storage capacity in the SAM DRAM subsystem 30 to reduce system resource usage by eliminating excessive copying of data in host memory. An example of this would be when data is placed in the SAM DRAM subsystem as part of the SAM card operating system (O/S) kernel memory. From the kernel memory storage the data can be either copied to user memory within the host computer or remain on the SAM card. To achieve this read, data is moved from the SAM DRAM subsystem 30 to the right application in the host computer memory.

The SAM DRAM subsystem 30 must be able to hold a minimum of one second of diverse data object data in order to guarantee QoS. Thus the size of each DRAM storage bank 32 & 33 is dependent on the number of DDO streams being supported, the latency on the object retrieval from the SAM storage system, and the associated bit rates related to the multimedia object.

By way of example, if it is assumed that the invention is used in an ATM/SONET network at OC-3 data rates of 155 Mbps, the theoretical maximum user data rate is 140 Mbps after the overhead bits in the ATM cell are removed. Using the industry accepted figure of 80% network utilization, the design point for the SAM hardware at OC-3 data rates is 80% of 140 Mbps or 112 Mbps. If each DDO multimedia stream of data being served by the multimedia communications server had an average data rate of 3 Mbps, the SAM hardware can support 112 Mbps divided by 3 Mbps or 37 DDO streams of multimedia data. If each buffer must hold a minimum of 1 second of data in order to meet Guaranteed QoS, the calculation for buffer size is as follows:

(3 Mbps×2 buffers)×1 sec.×37 DDO streams=222 Mbits

Thus each 3 Mbps DDO stream of multimedia data requires 222 Mbits of buffer storage or 27.75 Mbytes (222 Mbits/8 bits) of buffer storage.

The hard disk drive storage subsystem 40 includes a hard disk drive storage interface 42, hard disk drive subsystem SRAM 44, and a connector 46 to connect the hard disk drive storage subsystem 40 to a hard disk drive for storage of DDO multimedia. An exemplary hard disk drive storage interface 42 would include a SCSI controller such as an Adaptec SCSI-2 controller with an integrated MIPS processor and a PCI bus interface as known to those skilled in the art. The SCSI-2 specification is described in ANSI document No. X3.131-1994 which is also incorporated herein by reference. Fiber channel or SCSI-3 storage controllers can also be used as available.

It should be appreciated that a SCSI processor used as part of the hard disk drive storage interface 42 can support SCSI functions such as disconnect and reconnect. This would minimize interrupts back to the SAM CPU 22 and should improve the overall performance of the invention.

The SRAM 44 serves as a fast storage medium to improve the performance of the hard disk drive storage subsystem 40. The size and type of SRAM should be matched to the type of SCSI controller chosen when implementing the invention.

The hard disk drive storage subsystem 40 will serve as non real-time storage for large quantities of multimedia data including but not limited to video, voice, music, and images. From the host computer operating system perspective, the hard disk drive storage subsystem 40 as part of the overall SAM communications server storage should look like and function like a traditional computer add-on card. This is important since the host server manages the storage and retrieval of DDO on the SAM storage subsystems.

Data is transferred to and from the non-real time storage of the hard disk drive storage subsystem 40 to the real time storage of the SAM DRAM subsystem 30 over the SAM PCI internal bus 70 under the control of the SAM CPU 22. Data is transferred in bursts at PCI bus speeds. It is important to note that the hard disk drive storage subsystem 40 should either occupy the SAM PCI internal bus 70 for no longer than 16 clocks and/or honor a PCI bus disconnect within 250 ns. These requirements are necessary to maintain the Guarantee of QoS for real time multimedia communications at OC-3 speeds over the ATM network. An example of data transfer over the SAM PCI internal bus 70 under the control of the SAM CPU 22 would be storage of a live audio and video broadcast from a network such as SNET using off-the-shelf compression cards. The original broadcast could be compressed and stored real time in the SAM DRAM subsystem 30. The multimedia data can then be transferred to the hard disk drive storage subsystem 40 for permanent storage. At a later time, according to the preferred embodiment, the SAM card hardware 10 can then retransmit the stored broadcast to multiple clients over the ATM network.

The network interface subsystem 50 is comprised of a SONET/ATM network interface 52, network interface SRAM 54, and a connector to the ATM network 56. The ATM network interface 52 supports a full 155 Mbps OC-3 SONET interface in both the transmit and receive directions. It is anticipated that the connector 56 would be single mode fiber optics and signaling. The SONET/ATM network interface 52 should be designed around high performance VLSI devices since it is anticipated that a software based interface would be too slow to support ATM transmission speeds of OC-3 and higher. An exemplary ATM network interface 52 may be designed around the LSI ATMizer chipset for ATM network interfaces. The LSI ATMizer chipset has an internal MIPS processor to increase the data throughput of the ATM user interface. The network interface SRAM 54 is selected to correspond to the size and speed appropriate for the interface ATM chipset chosen to implement the network interface subsystem 50. Each DDO data stream being interfaced between the SONET/ATM network interface 52 and the ATM network requires a small amount of network interface SRAM 54 for buffering purposes. The network interface SRAM 54 should not be used for any other purpose by the SAM CPU 22 or host computer CPU since uninterrupted high speed data storage and retrieval to and from the ATM network is critical to overall SAM card performance.

The system I/O bus interface 60 is the interface between the SAM card 10 and the computer system I/O bus 80. The system I/O bus interface 60 is a high speed interface to enhance the functionality of the SAM card. The interface permits transfer of large DDO (as large as several gigabytes) between the host computer system I/O bus 80 and the SAM PCI internal bus 70 without bottlenecking. This enables the host computer to perform non-real time processing of DDO for image, voice, 3D, and animation.

The system I/O bus interface 60 logic should have the following attributes: (1) a high speed DMA interface; (2) support for peer-to-peer data transfers; (3) support for I/O bus master interface to the system I/O bus 80; (4) a programmable arbitration unit for the SAM PCI internal bus 70; (5) an interrupt interface to and from the system for the SAM CPU 22; and (6) address decoding between the host computer I/O bus 80 and the SAM DRAM subsystem 30.

An exemplary system I/O bus interface 60 may include an Intel PtoP chipset with an 1960 microprocessor PCI to PCI bridge bus interface. The PCI to PCI interface should support a 64 bit PCI bus. An exemplary system I/O bus interface 60 may also include a DEC PCI to PCI bridge chipset if appropriate for a non-Intel microprocessor host computer.

The SAM PCI internal bus 70 allows communications between the SAM CPU subsystem 20, the hard disk drive storage subsystem 40, the SAM DRAM subsystem 30, the SONET/ATM network interface subsystem 50, and the system I/O bus interface 60. The internal PCI bus architecture permits data transmission at speeds up to 132 Mbps. This fast internal bus architecture is a key feature of the present invention and allows for high speed data transmission, processing, storage, and retrieval without loading the host computer system I/O bus 80. In other words, the majority of the multimedia communications is processed by the SAM card over the internal PCI bus 70 independent of the host computer's resources.

SAM System Software

In accordance with the preferred embodiment of the present invention, the SAM hardware requires corresponding SAM software protocols for the SAM card and for the host computer. As with any OSI based protocol model, the lower layers of the card protocol are dedicated to the transmission of bits, packets, and cells within the network. The higher layers handle network interconnection, file service, LAN and ATM interfaces, and storage functions. The host computer protocols occupy the upper layers of the software and are responsible for the interface between the SAM multimedia card and the host computer's operating system. Functions handled by the upper layer protocols include LAN emulation, the file system, the DDO object manager, and presentation and server applications.

Referring now to FIG. 2, the protocol layered block diagram for the SAM software is shown. The upper layer software protocols 100 are comprised of the server applications 102, file system 104, DDO object manager 106, host adapter 108, ATM network API interface 110, and the LAN emulation 112.

The server applications 102 include the multimedia communications server applications that are executing on the host computer. One example of a real-time peer-to-peer application controlled by this protocol software layer would be computer based network telephony. In this case, clients can call clients over the ATM network and do their own call setup. The server does not have to assist except to record a client call or perform some other type of multimedia storage. Other multimedia applications include but are not limited to real-time processing of DDO for image, voice, 3D, animation, modeling, and graphics simulations.

The file system 104 is the upper layer software responsible for controlling the data streams for each concurrent application running on the communications server. It should be appreciated that the file system software 104 is compatible with the DDO UNIX and Windows NT file systems which are optimized to store and retrieve large objects. In optimizing the disk storage and retrieval times the file system software 104 must account for the number of simultaneous DDO streams that each SAM card in the communications server is to support and the performance of the hard disk storage subsystem. The file system software 104 is also responsible to provide upon request a playlist for DDO. The playlist is a link list that tells the SAM card storage manager where and how to retrieve the full DDO from the storage system. The file system software 104 is additionally responsible for providing a list of open blocks on the hard disk drive storage subsystem 40 so that direct storage of multimedia data can take place without first storing the data to the host computer storage. Thus fast and efficient storage of DDO occurs directly from the network to the SAM hard disk drive subsystem 40 bypassing the host CPU and memory.

The DDO object manager 106 performs system resource management for the SAM cards and interfaces to the SAM storage manager 122 to provide a DDO API. The API is the application program interface. The purpose of this software is to pass commands from the application programs to the lower layers of protocol software. The DDO API should include but is not limited to the following commands:

| Command | Function |
| --- | --- |
| StartPlay | Start streaming object |
| PlayListloc | Here is where to go to retrieve the playlist |
| Stop | Stop streaming object |
| Pause | Pause streaming object |
| JumpForward | Jump X number of playlist buffers forward |
| JumpBack | Jump X number of playlist buffers backward |
| ButStat | Location of the current stream buffer |
| Object# | Number of total objects |
| SAMstat | SAM card status |
| AvailBand | Available bandwidth left on the ATM port |

In addition to the DDO API, the DDO object manager 106 is instrumental in delivering any object stream to the lower layer protocols 120.

The host adapter driver 108 is the driver software that resides on the host computer to interface the SAM card 10 to the host computer. The SAM card 10 should look and act like a traditional host adapter (HA) for system level calls. However, it should take advantage of the SAM DRAM subsystem 30 to reduce system resource usage. For example, when retrieving data the HA driver 108 can copy the SCSI data from the hard disk drive storage subsystem 40 into kernel memory located on the SAM card. The data from the SAM DRAM subsystem 30 can then be transferred via DMA to user application memory in the host computer's primary memory or cache.

The ATM network API 110 is the application program interface to pass commands to and from the host communication server to the ATM network. The ATM network API 110 must meet ATM specifications. Its main usage is for support of the ATM protocols and the ATM LAN emulation 112. LAN emulation over the ATM network will provide at least a 1OX performance increase over using traditional LANS. The ATM network API 110 should include but is not limited to the following commands: (a) ATM LAN emulation; (b) session manager protocol; (c) AAL5, AAL4, and AAL3; and (d) constant bit rate AAL5.

Referring again to FIG. 2, the lower layer protocols 120 are the SAM card software and firmware. The lower layer protocols are comprised of the SAM storage manager 122, the stream manager 124, the ATM streaming interface 126, the file server 128, the stream protocol 130, the network services 132, the LAN emulation interface 134, the TCP/IP 136, and the SAM LAN emulation 138.

The SAM storage manager 122 provides an interface between the network stream manager 124 and the hard disk drive storage subsystem 40. When the SAM storage manager 122 recognizes that a new DDO stream is started, it requests from the DDO object manager 106 a pointer to a playlist. The DDO object manager 106 will interface to the file system 104 to extract and format the playlist. The object manager 106 then passes a pointer back to the SAM storage manager 122 and the storage manager 122 will direct memory access (DMA) the playlist to the SAM card 10.

The stream manager 124 is the SAM software responsible for transferring data blocks also known as data chunks. It is the function of the stream manager 124 to receive requests for data from the clients via the file server software 128 and to relay the request to the SAM storage manager 122 to retrieve the requested data from SAM hard disk drive storage subsystem 40. Thus the stream manager 124 provides data flow control.

On the first data request, the SAM storage manager 122 will retrieve enough data to buffer the client data request from the stream manager 124. The SAM storage manager 122 will then return the buffer size and location to the stream manager 124. The stream manager 124 will setup the ATM chipset via the ATM streaming interface 126 and transmit the data in requested chunk sizes over the ATM network in AAL-5 PDUs. Once the stream manager detects that a full buffer is sent it then requests a new buffer from the SAM DRAM subsystem 30 to store the additional data from the hard disk drive storage subsystem 40. It is the function of the SAM storage manager 122 to return a pointer immediately and retrieve another buffer of data. This process continues until all the DDO stream is transmitted to the client or the API requests a different action.

It should be appreciated that the data rate that the stream is transmitted over the ATM network as controlled by the stream manager 124 is defined within the ATM chipset at the ATM streaming interface 126 at the call setup time. Thus the ATM chipset performs much of the stream management and data flow in conjunction with the stream manager 124.

The file server 128 is the part of the lower layer protocol software that serves as the interrupt handler. The SAM processor logic must be able to process interrupts fast and then assign them priorities. The file server 128 should be able to handle the following interrupt requests: (a) ATM transmit interrupts; (b) ATM receive interrupts; (c) SAM SCSI interrupts; (d) DMA interrupts; (e) Host CPU interrupts; and (f) Software interrupts.

The stream protocol 130 is an ATM protocol controlling the transfer of Packet Data Units (PDUs) over the ATM network. A PDU is a packet of data as large as 64 KB. The ATM cells contain PDUs that have header information and trailer information. The header includes an end of packet and end of cell bit flags. The last cell contains an error checking CRC (checksum). The checksum is used by the ATM chipset to determine if an error occurs during transmission of that PDU. If an error condition occurs, it is the responsibility of the stream protocol 130 to notify the upper protocol layers that a transmission error has occurred. The SAM card must decide what QoS parameters to use for that PDU and decide whether to (a) discard the PDU, (b) transmit the bad PDU, or (c) retransmit the PDU.

The network services 132 works in conjunction with the stream protocol for error detection and error handling. It should be appreciated that the network services software has the ability to support multiple protocols like FVC and Microsoft Tiger protocols via switching in and out different software modules.

The LAN emulation interface 134 is lower layer software that controls the protocol conversion between ATM and the type of LAN protocol being emulated. The LAN emulation interface 134 directly communicates with the upper layer LAN emulation software 112 residing on the host computer.

The LAN emulation interface 134 also communicates with the SAM LAN emulation 138 software layer. The SAM LAN emulation 138 insures that the data rates, signal levels, and timing necessary to emulate the LAN protocol are performed by the SAM card. This relieves the host computer from the task of performing LAN emulation functions.

The TCP/IP 136 protocol layer is an internetworking protocol that will allow TCP/IP encapsulated data to be transmitted over the ATM network. This layer of software will provide ATM to Internet data transmission capability.

The ATM protocol 140 is a cell relay standard protocol. It uses SONET as the physical layer protocol. The ATM protocol is presently defined by two different cell formats. The user-network interface (UNI) carries information between the user and the ATM network. The network-network interface (NNI) caries data between ATM switches. The ATM protocol 140 as shown here is a UNI.

It should be appreciated that the SAM architecture provides the ability to offer extremely reliable DDO solutions by using hard disks with redundant arrays of inexpensive disks (RAID) technology. It is possible to connect two SAM cards operating on different hosts and connected to each of the RAID units. Given this type of implementation, either hot standby or checkpointing can be used for fault recovery.

With hot standby, each of the SAM cards will be simultaneously retrieving and transmitting DDO. However, one of the SAM cards will be designated the active and the other the backup. The backup will either assign the VCI/VPI to dev/null or have the OC-3 transmit optics turned off. The active SAM card will transmit the DDO over the AAL5-PDUs. At the end of transmitting a PDU, the active SAM will send an ATM-AAL3 cell to the backup SAM card indicating an "OK" or "pause." If the backup SAM card does not see the signals, the backup SAM will turn on its port and become the active SAM.

With checkpointing, the DDO playlist pointers are copied to the other SAM card (checkpointed) so that if two systems connected together lose their synchronization, the other system will continue approximately where the DDO stream was interrupted, rather than from the beginning.

It should also be appreciated that SAM to SAM card communications is possible. This enables the DDO file system to stripe the DDO across the SAM cards. This permits a larger number of simultaneous streams that can be accessed per DDO copy. This feature can result in a cost savings since the storage of the DDO is the most costly component of the invention.

Example Delivery of Real-time DDO Streams

The following section illustrates how the system level software interacts with the SAM hardware and software to stream a pre-stored DDO to a client over an ATM network. The client is networked to the server over an ATM network and is requesting data chunks.

An incoming ATM protocol 140 cell is received. The network services 132 and the stream protocol 130 determine the cell that is to be passed into the host computer system's object manager software 106. The DDO object manager 106 then determines the type of request and determines whether the appropriate SAM card 10 has the required resources stored in the hard disk drive storage subsystem 40 to honor the request. If not, a message is passed back to the client to decline the request. If the resources are available, the DDO object manager 106 requests information from the file system 104 to determine if the SAM card 10 has a valid playlist for the DDO. If not, a new playlist for that DDO is sent to the SAM card 10. Once the DDO object manager 106 knows the SAM card 10 has a valid playlist, it then requests the SAM storage manager 122 to start the DDO stream. Initially, the SAM storage manager 122 retrieves the first two buffers of the DDO from the hard disk drive storage subsystem 40 and copies it into the SAM DRAM buffers 34 & 35. The playlist pointers get incremented by the stream manager 124. The first buffer is handed to the stream manager 124, stream protocol 130 is added, and the network services 132 transmits the data over the ATM network using the ATM protocol 140. Once the buffer is transmitted, the file server 128 gets an interrupt and then requests another buffer from the stream manager 124. The SAM storage manager 122 then retrieves the next buffer of the DDO pointed to by the playlist pointer. This continues until the end of the playlist or until the DDO object manager 106 redirects the DDO stream via the API.

While the present invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected.

What is claimed is:

1. In a computer system comprising a network card and a first processor coupled to the network card via a system bus, a method of transferring a diverse data object between the computer system and a network, comprising the steps of:

the first processor receiving a diverse data object request via the system bus;

the first processor scheduling via the system bus a second processor of the network card to control at least a portion of a transfer of the diverse data object between a mass storage device coupled to the network card and the network; and the second processor causing the portion of the transfer of the diverse data object to be transferred between the mass storage device and the network via an internal bus of the network card.

2. The method of claim 1, further comprising the steps of:

storing a portion of the diverse data object in a memory subsystem of the network card having a greater bandwidth than the mass storage device; and transferring the diverse data object from the memory subsystem to the network via the internal bus.

3. The method of claim 2, wherein the step of storing the portion of the diverse data object in the memory subsystem includes the step of:

storing at least 1 second of the diverse data object in the memory subsystem prior to transferring the diverse data object from the memory subsystem to the network via the internal bus.

4. The method of claim 3, wherein the step of transferring the diverse data object from the memory subsystem has a transfer rate between 112 Mbps and 132 Mbps.

5. The method of claim 1, further comprising the step of:

converting the diverse data object to a form suitable for transferring across a SONET/ATM network.

6. The method of claim 5, wherein the step of converting the diverse data object is capable of handling an optical carrier rate between 51.84 Mpbs and 622.08 Mbps.

7. An I/O card for a computer system having a system bus and a first processor, comprising:

an internal bus;

a first connector, a second connector, and a third connector, each operatively coupled to said internal bus;

said first connector configured to detachably couple to the system bus;

said second connector configured to detachably couple to a mass storage device;

said third connector configured to detachably couple to a network; and a second processor coupled to said internal bus and configured to control at least a portion of a transfer of a diverse data object between said mass storage device and said network via said internal bus.

8. The I/O card of claim 7, further comprising a memory subsystem having a greater bandwidth than said storage device; and wherein a portion of said diverse data object is stored in said memory subsystem prior to sending to said network via said internal bus.

9. The I/O card of claim 8, wherein at least 1 second of said diverse data object is stored in said memory subsystem prior to sending to said network via said internal bus.

10. The I/O card of claim 9, wherein said internal bus has a bandwidth of 112 Mbps to 132 Mbps.

11. The I/O card of claim 7, wherein said third connector includes a SONET/ATM network interface.

12. The I/O card of claim 11, wherein said SONET/ATM network interface has an optical carrier rate between 51.84 Mpbs and 622.08 Mbps.

13. A communications server, comprising:

a system bus for transmitting data;

a first processor coupled to said system bus and configured to control a transfer of a diverse data object between a mass storage device and a network; and an I/O card having a first connector, a second connector, and a third connector, each operatively coupled to an internal bus;

wherein said first connector is configured to detachably couple to said system bus, said second connector is configured to detachably couple to said mass storage device, and said third connector is configured to detachably couple to said network; and wherein said I/O card decreases data traffic over said system bus by causing at least a portion of said diverse data object to be transferred between said mass storage device and said network via said internal bus.

14. The communications server of claim 13, wherein said I/O card further comprises a second processor coupled to said internal bus and configured to control at least a portion of said transfer of said diverse data object across said internal bus.

15. The communications server of claim 14, wherein said I/O card further comprises a memory subsystem having a greater bandwidth than said mass storage device; and wherein a portion of said diverse data object is stored in said memory subsystem prior to sending to said network via said internal bus.

16. The communications server of claim 15, wherein at least 1 second of said diverse data object is stored in said memory subsystem prior to sending to said network via said internal bus.

17. The communications server of claim 16, wherein said internal bus has a bandwidth of 112 Mbps to 132 Mbps.

18. The communications server of claim 14, wherein said third connector includes a SONET/ATM network interface.

19. The communications server of claim 18, wherein said SONET/ATM network interface has an optical carrier rate between 51.84 Mpbs and 622.08 Mbps.

* * * * *